May 11, 1965     C. F. JUENG     3,182,580
COMPOSITE GRAVITY VENTILATOR

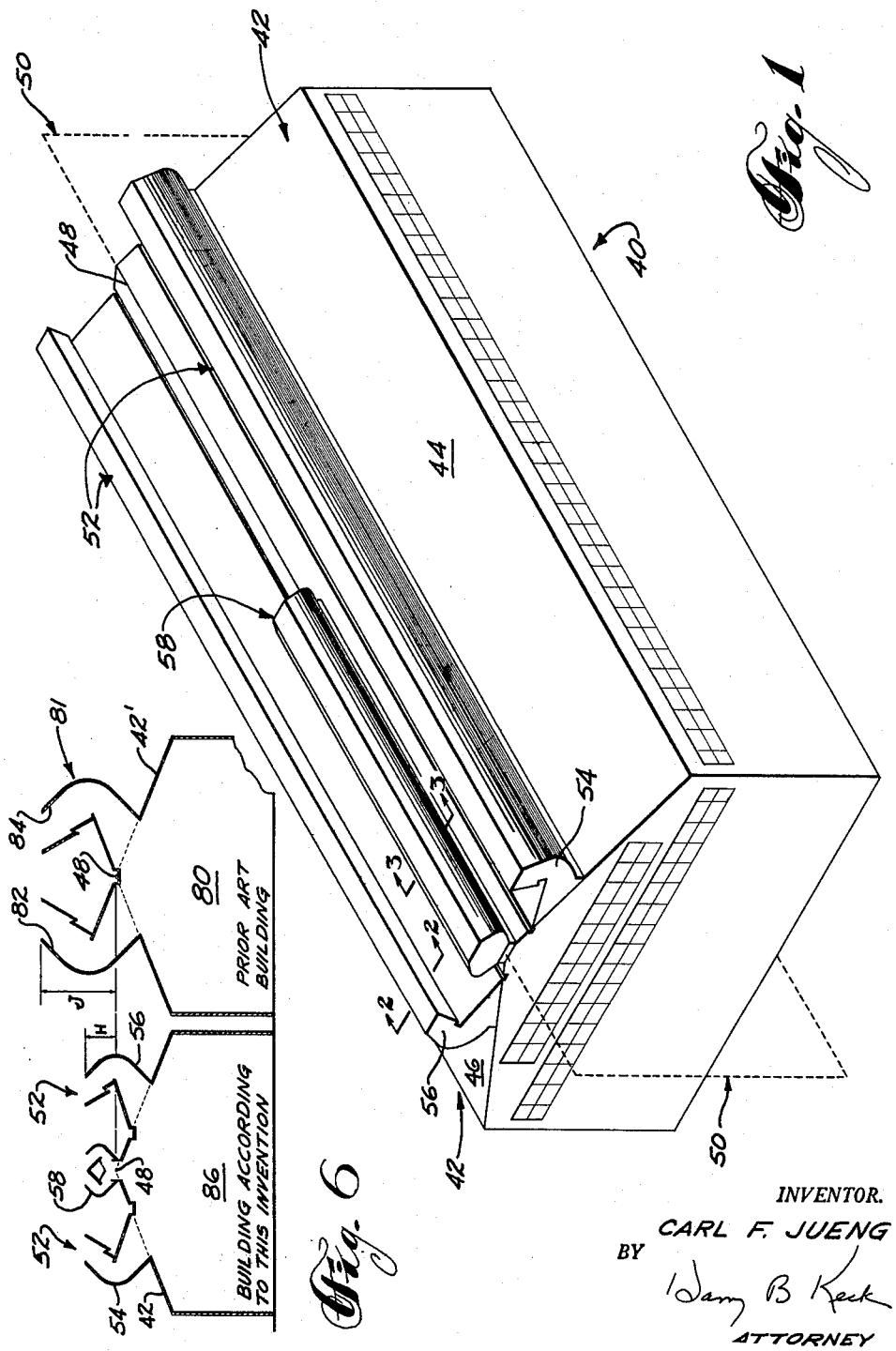

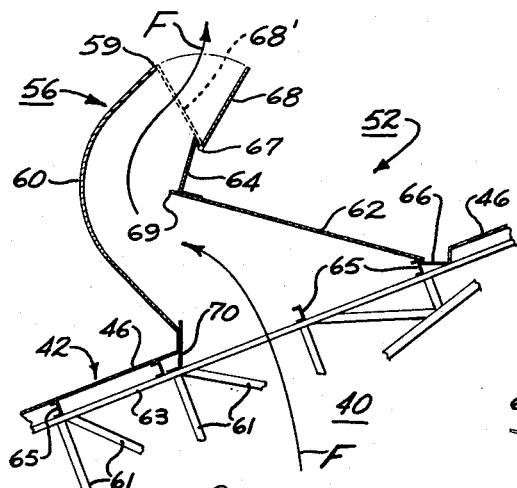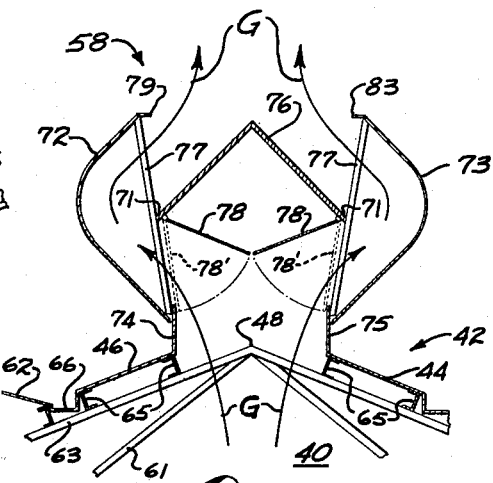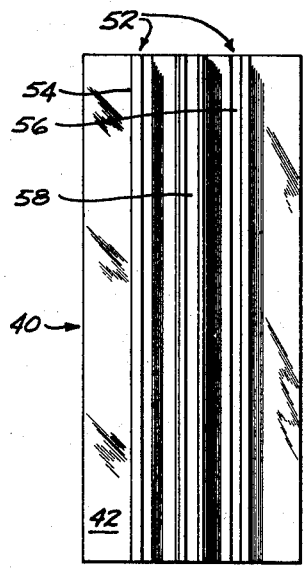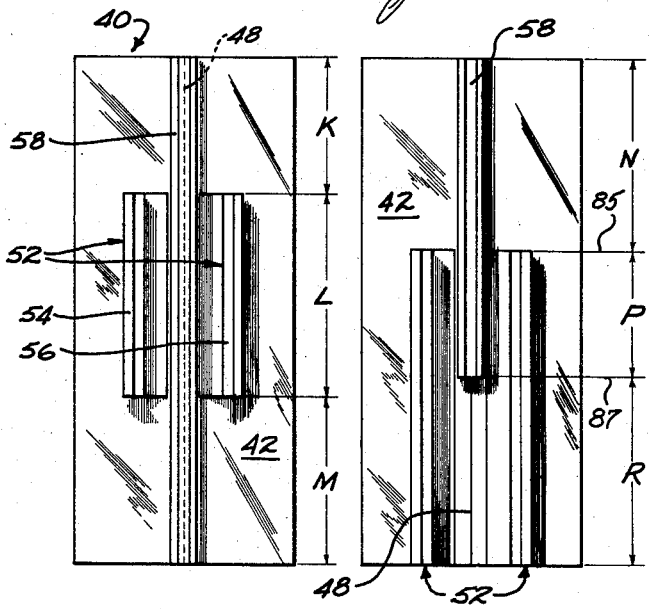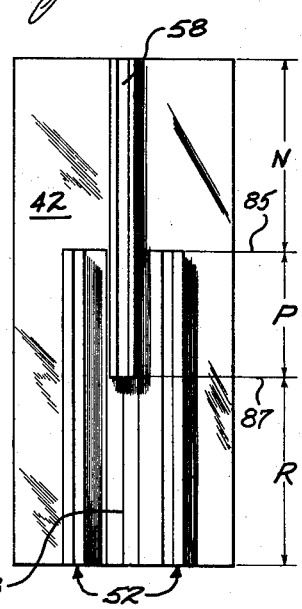
INVENTOR.
CARL F. JUENG
ATTORNEY

Filed Oct. 22, 1963     3 Sheets-Sheet 3

INVENTOR.
CARL F. JUENG
BY
    Harry B. Keck
    ATTORNEY

United States Patent Office 3,182,580
Patented May 11, 1965

3,182,580
COMPOSITE GRAVITY VENTILATOR
Carl F. Jueng, Pittsburgh, Pa., assignor to H. H. Robertson Company, Pittsburgh, Pa., a corporation of Pennsylvania
Filed Oct. 22, 1963, Ser. No. 317,979
1 Claim. (Cl. 98—42)

This application is a continuation-in-part of my copending patent application Serial Number 109,573, filed May 12, 1961, now abandoned.

This invention relates to a composite ventilator construction including both a monitor ventilator and a ridge ventilator. More particularly this invention relates to a composite ventilator construction for exhausting large quantities of heated gases from the interior of a building.

The most important application of extremely large roof ventilators is in high temperature industrial buildings such as glass plants and metal melting plants. These and other industrial plants have large buildings housing equipment which releases large amounts of heat to the ambient air by virtue of their high temperature and of their large surface area. Further this equipment is usually localized so that, in effect, the building is divided into relatively high and relatively low heat release zones.

The ventilation of such buildings requires the rapid removal of large quantities of heated gases. This gas removal is most economically accomplished by the use of large natural draft roof ventilators, which are sometimes called "gravity ventilators" to indicate that no fans or blowers are required in the ventilator. The ventilating opening in the roof of a building is dimensioned in direct proportion to the amount of gas that is to be exhausted. Thus a large quantity of gas requires a large roof opening which in turn requires a large ventilator. Besides functioning as a device for exhausting hot air, the roof ventilator must also prevent the ingress of precipitation and atmospheric debris and also prevent reverse flow of air due to wind currents.

There are two major design considerations associated with large roof ventilators. First, the amount of structural steel required to support their dead weight; and second, their exposed lateral surface area which is directly proportioned to their overall height.

Up to the present time, the large roof ventilators have required large amounts of structural steel merely to support their weight. Further their large lateral surface areas require additional structural steel to resist anticipated wind loads. In new buildings this added steel increases the cost of the initial building construction. In old buildings this added steel increases the cost of altering ventilator installations.

One prior art method of ventilating buildings having both a relatively high heat release zone and a relatively low heat release zone is to provide a large roof ventilator for exhausting gases from the relatively high heat release zone and to provide small roof ventilators for exhausting gases from the relatively low heat release zones. The small ventilators heretofore have always been spaced from the large roof ventilator.

This combination, which sometimes is found in existing buildings, usually results in the large ventilator drawing on the smaller ventilators. That is, the large ventilator tends to draw gases away from the small ventilators. In some instances outside air is actually drawn into the building through the smaller ventilators by the overpowering suction of the large ventilator. The usual remedy for this situation is to provide interior building partitions at each end of the large ventilator. These partitions hang from the ceiling line down to a point low enough so that the drawing action is prevented or curtailed. Thus the expense of providing partitions adds further to the costs of such installations.

Another prior art method of ventilating such a building is to provide a large roof ventilator which extends the entire length of the building. Usually the capacity of this ventilator is designed to accommodate the large requirements of the high heat release zone. However, as a cost-compromise, the ultimately approved design provides overall a large ventilator having insufficient capacity for the high heat release zone and having excess capacity for the low heat release zones.

This method points out a third problem, i.e., the efficient proportioning of the ventilating capacity. Although the first above-mentioned prior art method solves the problem of proportioning the ventilating capacity, it is accompanied by the increased costs and inconvenience associated with the provision of partitions.

Thus it is the primary object of this invention to provide for high heat-release buildings a composite gravity ventilator which may be efficiently proportioned in capacity to provide suitable ventilation for all areas of an industrial building.

Another object of this invention is to provide a composite gravity ventilator which is physically smaller than prior art ventilators of comparable capacity, thereby requiring less structural steel for construction and support.

Still another object of this invention is to provide a composite gravity ventilator having a lower silhouette than prior art ventilators of comparable capacity, thereby reducing the wind load that must be sustained by the supporting structural steel.

A further object of this invention is to provide a composite ventilator that is easy to install and relatively inexpensive.

In order to comprehend the nature of this invention, it is necessary to understand certain developments in the ventilation art and to place them in their perspective as recognized by the ventilation art. Specifically the so-called "monitor ventilator" must be recognized for what it is. Likewise the so-called "ridge ventilator" must be fully appreciated as it has heretofore been utilized in the ventilation arts.

The essential background information as well as a detailed description of the present invention will be set forth herein with reference to the accompanying drawings in which:

FIGURE 1 is an isometric view illustrating a building having a roof with the present composite gravity ventilator mounted thereon;

FIGURE 2 is a fragmentary cross-sectional view taken along the line 2—2 of FIGURE 1 showing a monitor ventilator;

FIGURE 3 is a fragmentary cross-sectional view taken along the line 3—3 of FIGURE 1 showing a ridge ventilator;

FIGURE 6 is a schematic illustration, in outline form, of side-by-side buildings having a prior art ventilator on the roof of the right-hand building and having the present composite ventilator on the roof of the left-hand building for comparison;

FIGURE 7 is a plan view of a building similar to that of FIGURE 1 illustrating an alternative embodiment of the present composite gravity ventilator wherein the ventilating capacity is uniform throughout the building;

Figure 4:
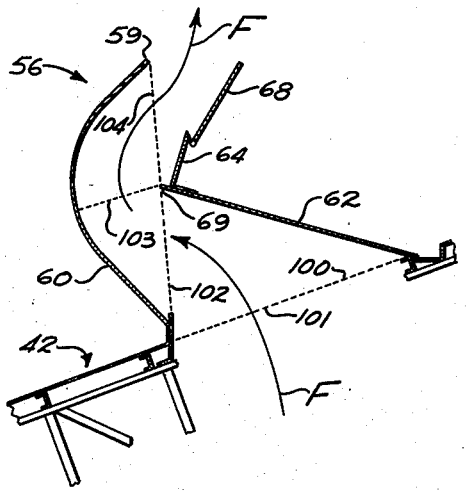
FIGURE 4 is a cross-sectional view of a typical monitor ventilator similar to FIGURE 2.

FIGURE 8 is a plan view, similar to FIGURE 7, illustrating a further alternative embodiment of the present composite gravity ventilator wherein maximum ventilation is provided in the central portion of the building; and FIGURE 9 is a plan view similar to FIGURE 7 illustrating a still further embodiment of the present composite gravity ventilator wherein three different ventilating capacities are provided.

The present invention

Heretofore the ventilation of industrial buildings has utilized either the ridge ventilator or the monitor ventilator, according to the exhaust resuirements of the building. According to this invention, it is possible to combine a ridge ventilator and a monitor ventilator to achieve improved ventilation not heretofore available.

The essential feature of the present invention resides in combining both a ridge ventilator and a monitor ventilator in a single building in cooperating relationship wherein the two ventilators provide exhaust capacity for at least one selected zone of the building. Heretofore the ventilation art was required to choose between either a ridge ventilator or a monitor ventilator. Until the present invention, the combination of the two was not available.

Advantages

As exhaust capacity requirements become excessive, they cannot be accommodated by a ridge ventilator, but only by a monitor ventilator. Ridge ventilators having a width of about 14-feet have been installed in the United States. Monitor ventilators having a cumulative width of about thirty feet have been constructed in the United States. These extremely large ventilators are so huge that the ventilator in fact dominates the building on which it is installed. This is objectionable from the standpoint of architectural aesthetics. It is also objectionable from the viewpoint of costs. Enormous monitor ventilators extend for thirty feet above the level of a building. The exposed surface presents an enormous exposed area which must resist wind loads. Sufficient structural steel must be incorporated into the building to provide the needed stability for the building. The huge thirty-feet high monitor ventilators themselves are heavy because of their size alone and thereby require substantial quantities of subjacent structural steel and internal structural steel for stability.

The present structure provides for wider-apart spacing of the two clamshell elements of an otherwise conventional monitor ventilator and the introduction therebebetween of a ridge ventilator. The tops of the two clam-shell elements are substantially aligned with the top of interposed ridge ventilator so that the three units do not draw exhaust, one-from-another. The inclusion of the two ventilators permits the ventilation engineer and the architect to provide an aesthetically pleasing building which accommodates varied industrial activities under suitable ventilation conditions.

The precise ventilation is achieved by extending either the monitor ventilator or the ridge ventilator or both over those regions where the exhaust capacity of either or both corresponds with the needs of the subjacent building activities. The resulting building has a significantly lower silhouette for the same exhausting capacity than could be achieved heretofore. The total exposed area of ventilator is greatly diminished for the same exhausting capacity with an accompanying diminution in the needed weight of structural steel. The overall weight if the ventilating apparatus is significantly lowered for the same exhaust capacity.

Detailed description

Refrerring to FIGURE 1, there is illustrated a building 40 having a roof 42 including two sloped roof surfaces 44, 46 whose intersection defines a salient ridge 48. A vertical central plane 50 of the building 40 is illustrated in phantom outline with the salient ridge 48 lying therein.

The present composite ventilator incorporates both a monitor-type ventilator and a ridge-type ventilator.

A monitor ventilator 52 is shown extending over a first portion of the roof 42. In this specification the term "first portion of the roof 42" refers to that portion of the roof 42 over which the monitor ventilator 52 extends. The monitor ventilator 52 comprises two corresponding clam-shell elements 54, 56 mounted on the sloped roof surfaces 44, 46 respectively. Preferably the two clam-shell elements 54, 56 are spaced substantially equidistant from the vertical central plane 50 of the building 40.

The salient ridge 48 extends over a second portion of the roof 42. In this specification the term "second portion of the roof 42" refers to that portion of the roof 42 over which the salient ridge 48 extends. A ridge ventilator 58 is mounted centrally upon the salient ridge 48. The ridge ventilator 58 is thus positioned intermediate of the two clam-shell elements 54, 56 on the monitor ventilator 52.

In FIGURE 1 the salient ridge 48 extends over the entire length of the building 40. Alternatively the salient ridge 48 may extend only over that portion of the roof 42 (herein referred to as the "second portion of the roof") which is covered by the ridge ventilator 58. Thus this present invention requires that the above-mentioned first and second portions of the roof 42 be at least in part coextensive. The present invention further requires that at least a segment of the ridge ventilator 58 be extended over that region wherein the first and second portions of the roof 42 are coextensive. The designations "first portion" and "second portion" of the roof 42 will be hereinafter explained more fully in relation to FIGURES 7, 8, 9.

In FIGURE 2 there is more fully illustrated the clam-shell element 56 of the monitor ventilator 52. As shown the clam-shell element 56 is mounted on the sloped roof surface 46 of the roof 42. The clam-shell element 56 is thereby in communicating relation with the interior of the building 40 for exhausting gases therefrom as illustrated by the arrows marked F.

The clam-shell element 56 comprises a cowling sheet element 60 having an upper rim 59 and a sloping wall surface 62 which terminates in a wall-surface-edge 69 whence an inner wall 64 rises. A rain gutter 66 is provided at the inboard end of the sloping wall surface 62. A pivotal damper 68 is pivotally secured to the inner wall 64 by means of a hinge 67. The damper 68 is shown in its fully open position in solid lines and is shown in its fully closed position in phantom outline (68'). The clam-shell element 56 further includes a curb wall 70 which is attached to the sloped roof surface 46. The outer cowl 60 is attached, at its lower end, to the curb wall 70. The other clam-shell element 54 of the monitor ventilator 52 is identical in construction and is mounted on the roof 42 connecting with the sloped roof surface 44.

Struts 61, 63 comprise the superstructure or roof truss of the building 40 and support the roof 42. Channels 65 may be provided as purlins to support the actual roof surface 46 and the ventilator 52.

In FIGURE 3 the ridge ventilator 58 is more fully illustrated. The ridge ventilator comprises a pair of spaced-apart side-walls 72, 73 each attached at the lower end thereof to a curb wall 74, 75 respectively and terminating in upper rims 79, 83 respectively. The curb wall 74 communicates with and is an extension of the roof surface 46. The curb wall 75 communicates with and is an extension of the roof surface 44. Internally the ridge ventilator 58 has a cap-member 76 in the form of a V-shaped deflector which is supported in the inverted-V position to divert entrant precipitation and atmospheric debris laterally. It will be observed that the vent-cap member 76 is wider that the throat of the ridge ventilator, i.e., wider than the distance between the tops of the curb walls 74, 75 which comprises the central ventilator opening of the roof 42. Internal struts 77 within the ridge ventilator connect component elements and provide the necessary rigidity and strength to resist wind forces which will be developed.

A pivotal damper 78 is pivotally mounted at each lateral edge 71 of the cap member 76. The dampers 78 are shown in their full-open position. In phantom outline in FIGURE 3, the pivotal dampers 78' appear in their fully closed position. The struts 61, 63 comprise the superstructure or roof truss of the building 40 and support the roof 42. The struts 63 are joined along the ridge 48 of the building. Channels 65 may be secured to the struts 63 to support the roof surfaces 44, 46 and the ventilator 58.

The ridge ventilator 58 is mounted centrally over the salient ridge 48 in communicating relation with the interior of the building 40 for exhausting gases therefrom as illustrated by the arrows labelled G.

The specific embodiment of ridge ventilator 58 or of the monitor ventilator 52 forms no part of my present invention. Numerous ridge ventilators have heretofore been installed throughout the country. Likewise, numerous monitor ventilators have been installed throughout the country. The present inventive concept relates to the combination of both a monitor ventilator and a ridge ventilator on the same building, as seen in FIGURE 1, without regard to the specific configuration of either ventilator.

FIGURE 4 is a substantial duplicate of FIGURE 2 with broken lines to indicate certain terminology which is pertinent to the monitor ventilator. It will be seen from the drawing that the monitor ventilator includes in sequence various gas passageways which include:

An entrant gas passageway 101 corresponding with the lateral ventilator opening 100 of the roof 42;

A generally vertical gas passageway 102 which is defined on the top by the wall-surface-edge 69 and at the bottom by the outboard edge of the lateral ventilator opening 100;

An unobstructed curvilinear gas passageway 103 which is defined by the wall-surface-edge 69 and the inner surface of the cowling sheet element 60;

A monitor-outlet-gas passageway 104 defined by the wall-surface-edge 69 and the upper rim 59 of the cowling sheet element 60.

The monitor ventilator gas discharge passes sequentially through these enumerated gas passageways from the interior of the building to the atmosphere. A damper means is provided which includes the inner wall 64 and the pivotal damper 68 for controllably obstructing the monitor-outlet-gas passageway 104.

Figure 5:
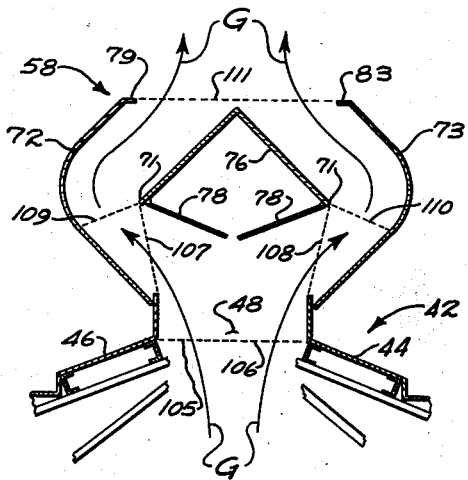
FIGURE 5 is a cross-sectional view of a typical ridge ventilator similar to FIGURE 3.

FIGURE 5 is a substantial duplicate of FIGURE 3 with broken lines applied to designate certain terminology which is pertinent to the ridge ventilator. It will be seen that the ridge ventilator includes in sequence various gas passageways which include:

A generally horizontal entrant gas passageway 105 which corresponds with the central ventilator opening 106;

A pair of opposed generally vertical gas passageways 107, 108, each being defined by a lateral edge 71 of the cap member 76 and the adjacent lateral edge of the central ventilator opening 106;

A pair of curvilinear gas passageways 109, 110, each defined by a lateral edge 71 of the cap member 76 and the interior surface of the side walls 72, 73;

A generally horizontal outlet gas passageway 111 defined by the upper rims 79, 83 of the side-walls 72, 73.

There are damper means within the ridge ventilator 58 for controllably obstructing at least one of the said gas passageways just described. Specifically, as shown in FIGURE 3 and FIGURE 5, the dampers 78 can be moved to the closed position 78' (FIGURE 3) where they obstruct the gas passageways 107, 108 (FIGURE 5).

The foregoing detailed description of both ventilator types has been included in the interest of complete disclosure of the present concept.

*General observations*

The present composite ventilator is provided in a building having at least three ventilator openings in the roof including:

A central ventilator opening which is provided along the salient ridge of the building and which extends substantially equidistant on both sides of the salient ridge;

Two lateral ventilator openings each disposed substantially equidistant from the vertical central plane of the building in which the salient ridge of the building is located.

The three ventilator openings are generally rectangular and have a length (in a direction parallel with the salient ridge) which is greater than the width (in a direction normal to the salient ridge).

*Advantages*

Attention is now directed to FIGURE 6 where there is illustrated in outline form a prior art building 80 (on the right) having a familiar monitor ventilator and, side-by-side on the left, a building 86 having the ventilation system of the present invention. The two buildings have the same ventilation capacity, i.e., the unobstructed cross-sectional width of the two ventilator systems is identical.

The building 86 includes, according to this invention, the hereinbefore-described monitor ventilator 52 with the clam-shell elements 54, 56 and the ridge ventilator 58 on the roof 42. Preferably the total ventilating capacity (cross-sectional opening) is distributed among the three ventilator openings, i.e., one-third is assigned to the ridge ventilator 58 and the remaining two-thirds is divided equally between the two clam-shell elements 54, 56 of the monitor ventilator 58. Preferably the upper rim of each ventilator 52, 58 is at the same elevation so that the ventilators have the same pulling power and do not draw exhaust one-from-another. All are shown at the elevation H above the ridge 48 of the building 86.

The building 80 includes a prior art monitor ventilator 81 on the roof 42' which is identical in slope and ridge elevation with the roof 42 of the side-by-side building 86. The prior art monitor ventilator 81 includes clam-shell elements 82, 84. The two clam-shell elements 82, 84 of the prior art monitor ventilator 80 correspond individually to the clam-shell elements 54, 56 of the ventilator 52, differing only in size and their spaced-apart distance.

For the purpose of comparison, the salient ridge 48 of the roofs 42, 42' appears at the identical elevation. It will be observed that the height of the monitor ventilator 81 (above the ridge 48) is marked by the letter J.

The following example, utilizing FIGURE 6 presents comparative data for the building 80 (having the prior art ventilator) and the building 86 (utilizing the present invention).

Assume that a building, 100 feet long, is to be ventilated. Further assume that the heat load in the building requires a ventilator outlet area of 2400 square feet. To ventilate this building 80, a 100-feet long prior art monitor ventilator 81 can be provided wherein each clam-shell element 82, 84 has an outlet area 12-feet wide. Alternatively the building 86 can be provided with a 100-feet long composite ventilator wherein each clam-shell element 54, 56 and the ridge ventilator 58 has an outlet area 8-feet wide. In both of the described buildings, the required ventilating capacity is provided.

The total dead-weight and windload of each ventilation system should be considered. Further the height above the salient ridge 48 should also be considered. The following table summarizes these factors for easy comparison.

| Item | Building 80 Prior Art Monitor Ventilator | Building 86 Composite Ventilator | Reduction |
|---|---|---|---|
| Total Dead Weight of Ventilator System (tons) | 40.3 | 33.9 | 6.4 |
| Wind Loads, Pounds (based on a wind load of 30 pounds per sq. ft.) | 130,500 | 99,500 | 31,000 |
| Height above salient ridge | 25'6" | 10'7" | 14'11" |

In choosing the composite ventilator of the present invention for ventilating the building 86:

The total dead weight of the ventilator alone is reduced by 6.4 tons or 15.9 percent;

The wind load is reduced by 31,000 pounds or 23.7 percent;

The height above the salient ridge 48 is reduced by 14 feet 11 inches or 58.6 percent.

Thus it can be seen from the above comparative data that the composite ventilator of the building 86 provides considerable advantages over the prior art monitor ventilator of the building 89 for the same exhaust capacities. These advantages encompass not only reduced weight and windload, but also a reduced building silhouette which may be considered desirable from an architecturally aesthetic viewpoint.

*Alternative embodiments*

As a primary objective, the present invention provides a composite ventilator whose ventilating capacity may be efficiently proportioned to provide the proper ventilation for each of different regions of a building. A plurality of ventilating exhaust capacities may be obtained by use of the present composite ventilator.

In FIGURE 7, there is illustrated one configuration of the present composite ventilator wherein both the monitor ventilator 52 and the ridge ventilator 58 extend over the entire length of the building. In this instance the building 40 is provided with the same ventilating capacity throughout its length.

In FIGURE 8 there is illustrated an alternative configuration of the present composite ventilator wherein the ridge ventilator 58 extends the entire length of the building 40 while the monitor ventilator 52 extends over only a portion of the building 40. Thus the building 40 is provided with zones, designated by the letters K, L and M which have different ventilating capacities. It should be apparent that per linear foot of ventilator, the ventilating ratio of the zones K, L and M is $$K:L:M = 1:3:1$$

Both the monitor ventilator 52 and the ridge ventilator 58 communicate with the interior of the building 40 in the zone labelled L. Hence in that selected zone L of the building 40, the ventilators 52, 58 cooperate to provide parallel sequential gas passageways leading from the interior of the building to the atmosphere.

In FIGURE 9 there is illustrated a further alternative configuration of the present composite ventilator. In this configuration the monitor ventilator 52 extends from one end of the building 40 through a first intermediate location (85) on the roof 42. Further the ridge ventilator 58 extends through a second intermediate location (87) on the roof 42.

Thus the building 40 is provided with zones, designated by the letters N, P and R which have different ventilating capacities. It should be evident that per linear foot of ventilator, the ventilating ratio of the zones N, P and R is $$N:P:R = 1:3:2$$

In the selected zone P, the ventilators 52, 58 cooperate to provide parallel sequential gas passageways leading from the interior of the building 40 to the atmosphere.

Thus in the alternative configurations illustrated in FIGURES 8 and 9, the total ventilating capacity of the different zones depends on the length of ventilator in each zone. Accordingly the present invention provides a composite ventilator which may be efficiently proportioned to provide suitable ventilation for all regions of the building.

In FIGURES 8 and 9, the salient ridge 48 extends over the entire length of the building 40. Thus it should be evident that the ridge ventilator 58 may be extended further as a unit along the salient ridge 48, or, separate ventilators may be added to the roof 42 at spaced distances, each consisting of an independent ridge ventilator. These additions would become necessary where additional heat loads occur within the building 40.

From the foregoing description it should be evident that the present invention provides a composite ventilator assembly having a ventilating capacity which may be efficiently proportioned to provide suitable ventilation for all regions of a building. Further the present invention provides a composite ventilator having a lower silhouette for comparable exhausting capacity, thereby reducing the wind load thereon. Still further, the present invention provides a composite ventilator requiring less structural steel support than other available ventilators of comparable capacity.

I claim:

In a building having a roof, the combination comprising a ridge ventilator and a monitor ventilator mounted on the said roof with their rims at substantially the same elevation;

the said roof having three elongated ventilator openings in cooperative ventilating communication with the interior of the said building as follows:
a central horizontal opening; and
a pair of lateral, outwardly presented vertical openings;
said roof having a raised portion on each side of the said central opening defining the said vertical openings;

the said ridge ventilator being disposed above the said central horizontal opening and having:
opposed side walls disposed parallel to each other and extending from (*a*) their base which is adjacent to the lateral edges of the said central horizontal opening upwardly and outboard of the said central horizontal opening to (*b*) an upper rim;
a cap member disposed between and apart from the said side walls and above the said central horizontal opening;
the said ridge ventilator having a pair of parallel gas passageways each located between the lateral edge of the said cap member and one of said side walls;

the said monitor ventilator comprising two cowling sheet elements, each parallel with the said side walls of the said ridge ventilator, and two damper means;
each said cowling sheet element extending (*a*) from its base at the building roof below the bottom edge of one of the said vertical openings upwardly outboard of the said vertical opening (*b*) to an upper rim which is disposed above said vertical opening so as to prevent straight-line entry of precipitation into the interior of the building;
damper means disposed between the said cowling sheet element and the said raised portion of the roof for controllably obstructing the gas passageway between the said cowling sheet element and the said roof.

References Cited by the Examiner

UNITED STATES PATENTS

| | | | |
|---|---|---|---|
| 901,120 | 10/08 | Nies | 98—42.1 X |
| 2,009,870 | 7/35 | Black | 98—42.1 X |
| 2,231,557 | 2/41 | Black | 98—42.1 |
| 2,404,961 | 7/46 | Hoch | 98—42.1 |
| 2,784,660 | 3/57 | Johnson | 98—42 |

FOREIGN PATENTS

| | | |
|---|---|---|
| 737,915 | 10/32 | France. |
| 552,871 | 4/43 | Great Britain. |

ROBERT A O'LEARY, *Primary Examiner.*